United States Patent [19]

Phillips

[11] Patent Number: 5,561,436
[45] Date of Patent: Oct. 1, 1996

[54] METHOD AND APPARATUS FOR MULTI-POSITION ANTENNA

[75] Inventor: James P. Phillips, Lake in the Hills, Ill.

[73] Assignee: Motorola, Inc., Schaumburg, Ill.

[21] Appl. No.: 278,295

[22] Filed: Jul. 21, 1994

[51] Int. Cl.$^6$ .................................................. H01Q 1/24
[52] U.S. Cl. ............................ 343/702; 343/818; 455/89
[58] Field of Search .................................. 343/702, 729, 343/730, 749, 752, 795, 856, 872; 455/89, 289, 351; H01Q 1/12, 1/24

[56] References Cited

U.S. PATENT DOCUMENTS

| | | | |
|---|---|---|---|
| 4,121,218 | 10/1978 | Irwin et al. | 343/702 |
| 4,313,119 | 1/1982 | Garay et al. | 343/702 |
| 4,630,061 | 12/1986 | Hately | 343/749 |
| 4,725,845 | 2/1988 | Phillips | 343/702 |
| 5,014,346 | 5/1991 | Phillips et al. | 455/89 |
| 5,337,061 | 8/1994 | Pye et al. | 343/749 |

OTHER PUBLICATIONS

IEEE Standard Dictionary of Electrical and Electronic Terms, An American National Standard, 4th Edition, 1988, pp. 666. ISBN: 1–55937–000–9.

*Primary Examiner*—Michael C. Wimer
*Attorney, Agent, or Firm*—Randall S. Vaas

[57] ABSTRACT

An antenna system includes a first antenna positioned on a first device housing and a parasitic radiator positioned on a second device housing. The housings move relative to one another to collapse the device during a standby mode and extend the device during an active communication mode. The first antenna and the parasitic radiator are positioned on their respective housings such that they are parasitically coupled when the housings are collapsed and are not coupled when the housings are extended.

22 Claims, 3 Drawing Sheets

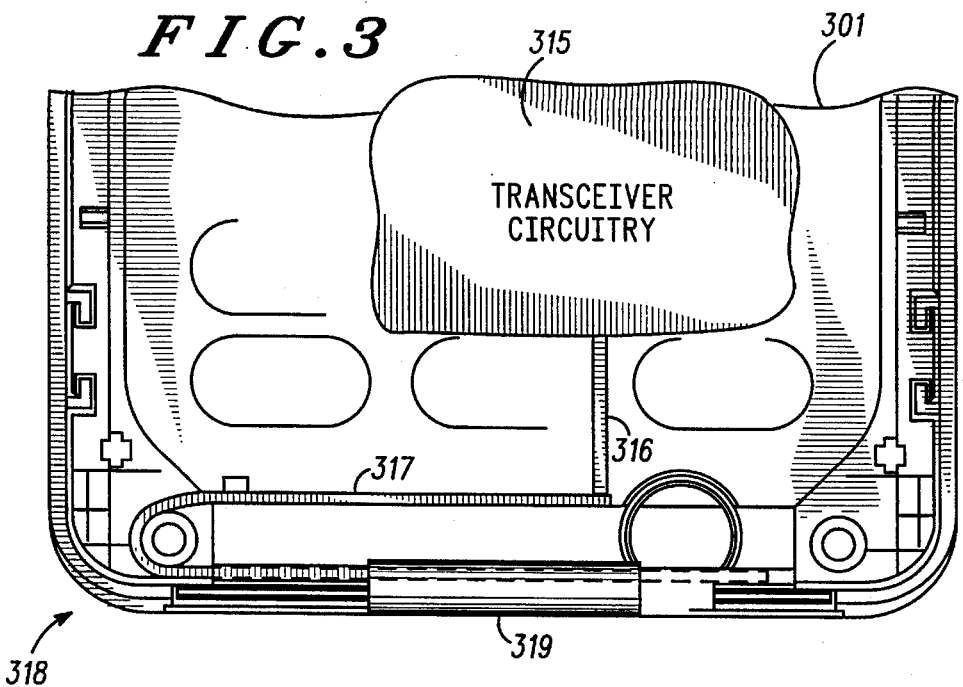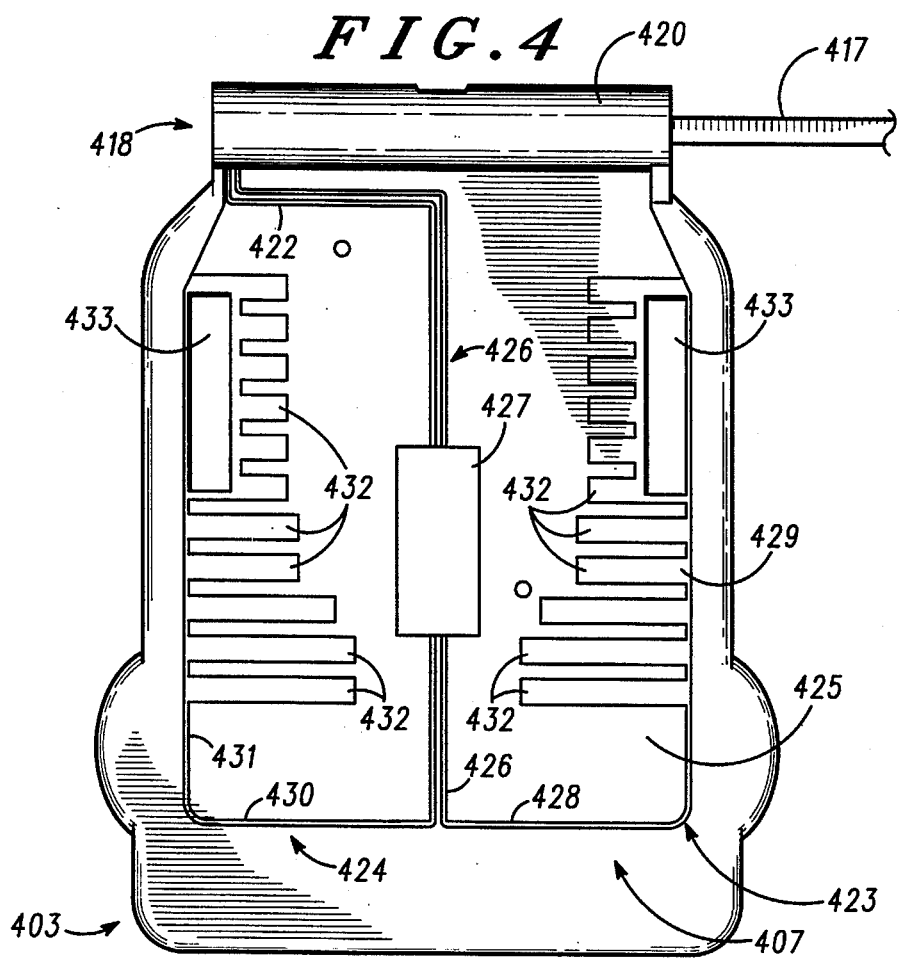

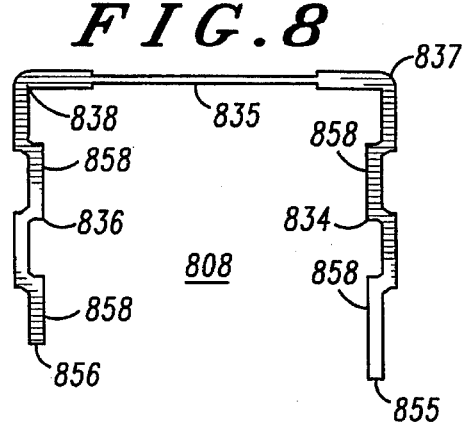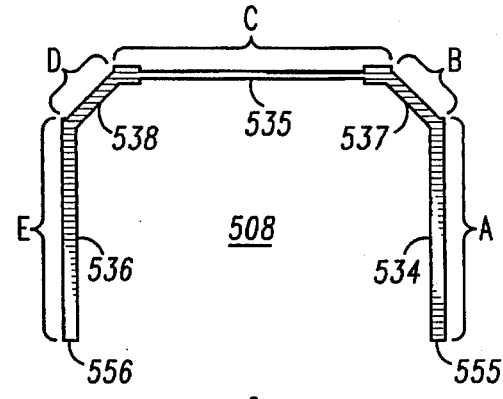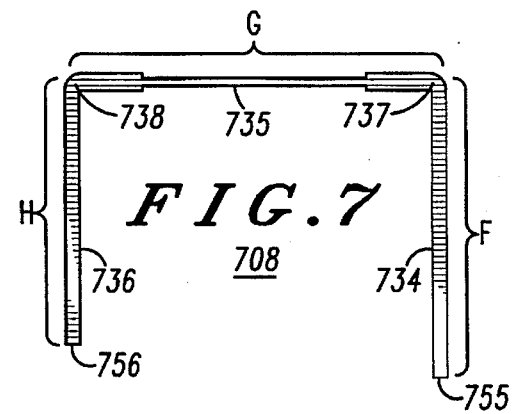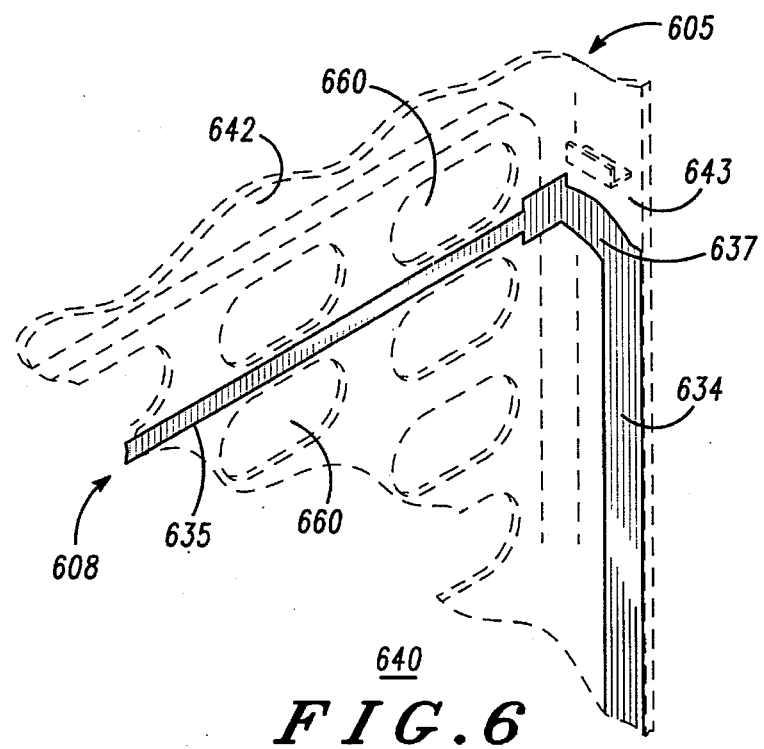

5,561,436

METHOD AND APPARATUS FOR MULTI-POSITION ANTENNA

FIELD OF THE INVENTION

The present invention pertains to antennas for communication apparatus.

BACKGROUND OF THE INVENTION

Radio communication devices include a transmitter and/or receiver coupled to an antenna which emits and/or detects radio frequency signals. The device may include a microphone for inputting audio signals to a transmitter or a speaker for outputting signals received by a receiver. Examples of such radio communication devices include one way radios, two way radios, radio telephones, personal communication devices, and a variety of other equipment. These communication devices typically have a standby configuration, wherein the device is collapsed for storage, and an active communication configuration, wherein the antennae is extended for optimum performance.

For radio telephones and two-way radios, it is typically desirable that these devices have a small size during a standby mode to facilitate storage and transport thereof. For example, users prefer that the radio telephones are small enough in the standby mode to permit storage in a shirt or jacket pocket. In the active communication state, it is desirable for the device to be sufficiently long to position the speaker adjacent to the user's ear, the microphone near the user's mouth, and the antenna away from the user's body. To meet these requirements, the radio telephone housing is reconfigurable to have smaller dimensions in the standby mode than they have in the active communication mode.

A difficulty encountered with prior art reconfigurable communication devices, such as radio telephones which must receive a call alerting signal in the standby mode, is providing a high performance antenna system in both the standby mode and the active communication mode. Although the extended antenna position allows for optimum antenna performance, the retracted position of the antenna in the standby mode which minimizes the dimensions of the communication device results in a decrease in antenna performance.

An example of a radio communication device including a multi-position antenna is a radio telephone including a body and flap, wherein the flap includes an antenna mounted thereon. When closed, the flap covers the radio telephone key pad and provides a compact housing. When the flap is opened, the flap antenna is spaced from the telephone body which the user holds. Although the flap antenna performs very well when the flap is open, the flap antenna is not ideally positioned to receive an alerting signal in the standby mode.

Accordingly, it is desirable to provide an antenna system having high performance characteristics when the communication device is extended in an active communication mode and when the communication device is collapsed in a standby mode of operation.

BRIEF DESCRIPTION OF THE DRAWINGS

FIG. 3 is a fragmentary view illustrating the inside of the radio telephone housing according to FIG. 1 including a transceiver;

FIG. 4 is a plan view of a flap of the radio telephone according to FIG. 1 with the front housing section removed and illustrating a first antenna;

FIG. 5 is a fragmentary perspective view of a portion of the inside of a front housing section of the radio telephone body according to FIG. 1 illustrating a portion of a parasitic radiator;

FIG. 6 is top plan view illustrating the parasitic radiator according to FIG. 5;

FIG. 7 is a top plan view illustrating an alternate embodiment of the parasitic radiator according to FIG. 6; and FIG. 8 is a top plan view illustrating another alternate embodiment of the parasitic radiator antenna according to FIG. 6.

DETAILED DESCRIPTION OF THE PREFERRED EMBODIMENTS

Figures 1, 2:
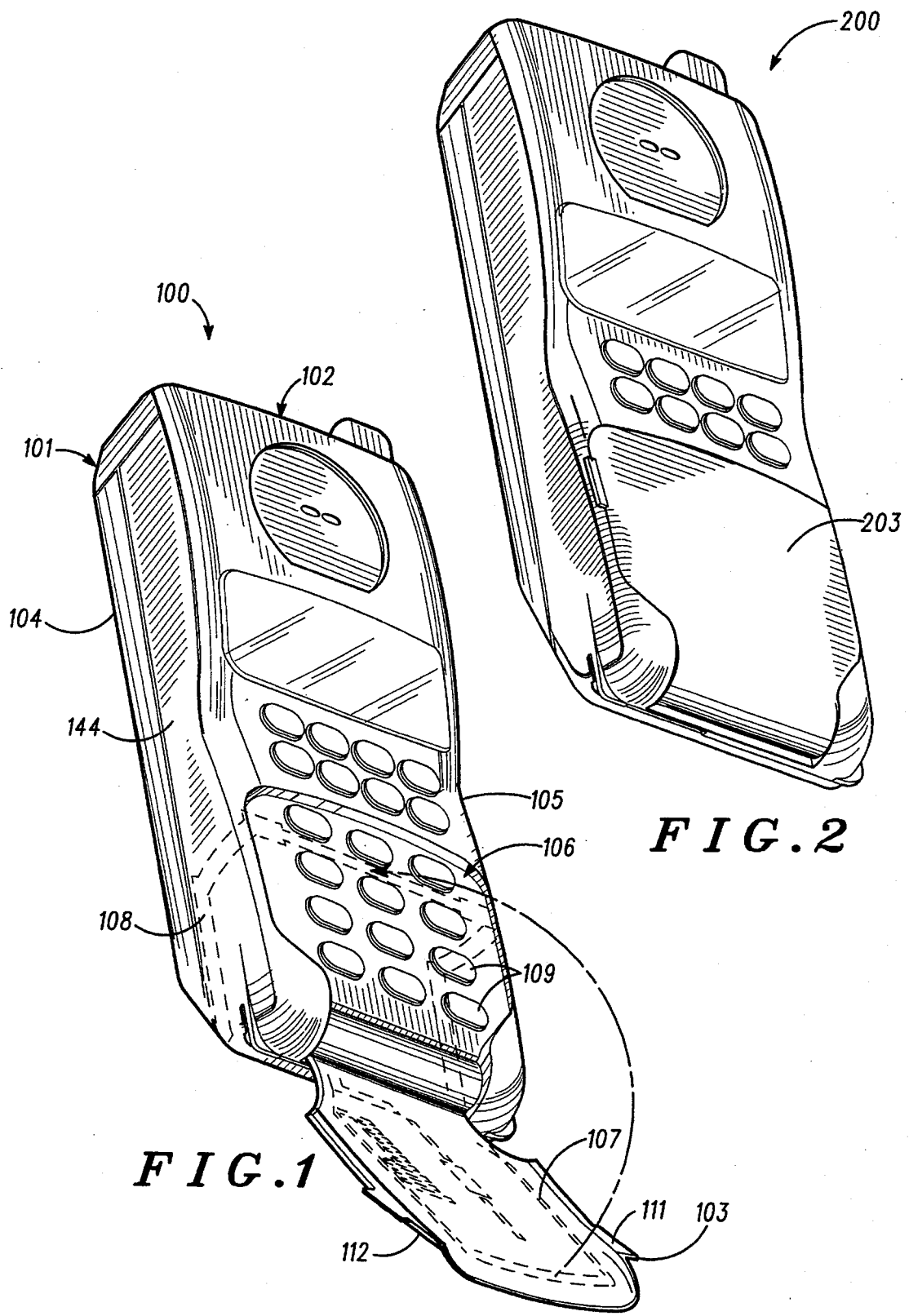
FIG. 1 is a front perspective view illustrating an extended radio telephone including an antenna system according to the invention.
FIG. 2 is a front perspective view illustrating a collapsed radio telephone according to FIG. 1 which is in the standby configuration.

The present invention is embodied in a multi-position antenna system for a device including a housing having first and second housing portions which move between a first extended position and a second collapsed position. Circuitry is positioned in the housing to transmit or receive signals. A first antenna is supported on the first housing portion and is connected to the circuitry. A parasitic radiator is supported on the second housing section. The first antenna and the parasitic radiator are coupled when the housing is in the collapsed position. The first antenna and the parasitic radiator are not coupled in the extended position. The antenna system has high performance characteristics when the housing is extended during active communication and when the first antenna and the parasitic radiator are coupled while the housing is collapsed.

Initially it is noted that those components shown in more than one drawing figure have the same last two digits in all the drawing figures. However, the first digit identifies the drawing figure being referenced, such that components in FIG. 1 have the first digit 1, components in FIG. 2 have the first digit 2, etc. It is also noted that the antenna system according to the invention is illustrated in a radio telephone including a flap 103 (FIG. 1), wherein the immediate invention is particularly advantageous. However, the invention may also be advantageously employed in other devices, such as one way and two way radios, or any other communication device employing an antenna. Accordingly, "device" and "equipment" as used herein refer to all such devices and their equivalents.

A radio telephone 100 incorporating the invention is illustrated in FIG. 1. The radio telephone includes a housing 102 including a first housing portion 101 and a second housing portion 103. In the illustrated embodiment, the first housing portion 101 is a radio telephone body and the second housing portion is a flap pivotably connected to the body. The flap 103 moves between an extended position illustrated in FIG. 1 during an active communication mode and a collapsed, or closed position, illustrated in FIG. 2, in a standby mode.

The radio telephone body 101 includes a back body housing section 104 and a front body housing section 105 which are interconnected to define an interior volume housing electronic circuitry (not shown). A key pad 106 is positioned in body 101 such that keys 109 (only some of which are numbered) associated with the keypad are accessible for manual actuation by the user. The illustrated flap 103 at least partially covers key pad 106 when closed. The cover may be extended to cover all the keys. The flap prevents actuation of the covered keys 109 when the flap is closed. Additionally, the flap may place the telephone in a standby mode when closed.

The flap 103 includes a first antenna 107, which is referred to herein as a flap antenna. The flap antenna is positioned between a front flap housing 111 and a back flap housing section 112, and thus is illustrated in phantom in FIG. 1. The front flap and back flap housing sections 111 and 112 are generally planar members, which may be manufactured of a suitable polymer. The flap antenna is sandwiched between these members. The flap antenna 107 is in an extended position when the flap 103 is open. The flap antenna is in a collapsed, or retracted, position when flap 203 (FIG. 2) is closed.

Body 101 includes a parasitic radiator, or second antenna 108. The parasitic radiator 108 is affixed to the inside of the front housing section 105, and is thus illustrated in phantom in FIG. 1.

Transceiver circuitry 315 is generally represented in FIG. 3. The transceiver may be implemented using any suitable conventional transceiver. The transceiver circuitry 315 is positioned in first housing portion 301 by conventional means, such as by mounting on a printed circuit board which is assembled between the front and back body housing sections 104, 105. The transceiver circuitry 315 is coupled to a microphone (not shown) and receiver (not shown) positioned in housing portion 301. The transceiver circuitry is also connected to an elastomeric connector 316 or other means, which connects to a flex conductor 317. The flex conductor 317 extends into a hinge assembly 318 including a knuckle 319. As illustrated in FIG. 4, the hinge assembly 418 also includes a knuckle 420 on flap 403 to engage knuckle 319. The flex conductor 417 is also connected to the first antenna 407 through the hinge assembly 418. The hinge assembly providing the connection between the flap antenna 407 and the transceiver 315 may have any suitable construction, such as the hinge disclosed in U.S. patent application Ser. No. 08/148,718, filed on Nov. 08, 1993 in the name of Tanya Rush et al., the disclosure of which is incorporated herein by reference thereto.

Flap antenna 407 (FIG. 4) includes two conductors 423 and 424 mounted on a board 425 such that the antenna is generally E-shaped in configuration. The flap antenna is manufactured of two thin strips of a suitable conductor, such as copper. The flap antenna 407 includes a joinder segment 422 electrically coupling middle finger segments 426 of conductors 423 and 424 with the flex conductor 417. The middle finger segments 426 include a transmission line transformer 427 providing impedance matching between antenna 407 and the transceiver circuitry 315 (FIG. 3). A cross member 428 of conductor 423 connects middle finger segment 426 to outer finger 429. The outer finger 429 extends generally orthogonally from one end of cross member 428. Conductor 424 similarly includes a middle finger segment 426 coupled to a cross member 430. Cross member 430 connects the middle finger segment of conductor 424 to an outer finger 431, which extends generally orthogonally to cross member 430. Elements 432 (only some of which are numbered) extend generally orthogonally from outer fingers 429 and 431 to provide a capacitive loading permitting shortening of antenna 407 to facilitate mounting of the antenna on the flap. A opening 433 which is cut out of each outer finger 429, 431 is provided to receive respective magnets (not shown). The magnets actuate read switches (not shown) in the radio telephone housing 101. The read switches and magnets are not described in greater detail herein since they do not form a part of the immediate invention.

The flap antenna 407 is thus a dipole antenna which is thin, such that it is sandwiched between front housing section 111 and back housing section 112, to construct a thin flap. The antenna is a half-wavelength antenna having high performance characteristics when the flap is open, as illustrated in FIG. 1. The cross members 428 and 430 of conductors 423 and 424 are high current sections of the flap antenna.

A parasitic radiator 508 is illustrated in FIG. 5. The parasitic radiator is not directly coupled the feed line 317, 417 of the flap antenna 407. The parasitic radiator 508 is generally U-shaped in configuration, including arms 534 and 536 extending generally orthogonally to a shoulder 535. An elbow 537 extends at an angle of approximately 45° with respect to arm 534 and shoulder 535 to join these members. An elbow 538 extends at an angle of approximately 45° with respect to arm 536 and shoulder 535 to join these members. This parasitic radiator is manufactured from any suitable electrical conductor, such as a thin, flexible copper strip having an adhesive on one side thereof.

The parasitic radiator is dimensioned according to the transceiver signal frequency. More particularly, the longitudinal axis of arm 534 has a length A, the longitudinal axis of elbow 537 has a length B, the longitudinal axis of shoulder 535 has a length C, the longitudinal axis of elbow 538 has a length D, and the longitudinal axis of arm 536 has a length E. Lengths A, B, C, D, and E are such that their sum is equal to approximately one-half the wavelength of the transceiver signal frequency.

The parasitic radiator 608 (FIG. 6) according to preferred embodiment is connected to an inside surface 640 of front housing section 605. The front housing section includes a planar front 642 and a sidewall 643. An opposite sidewall 144, which is not shown in FIG. 6 but can be seen in FIG. 1, extends in parallel to sidewall 643. The parasitic radiator 608 is assembled to inside surface 640 of the front housing section 605 using a suitable adhesive. The parasitic radiator 608 is flexible such that it conforms to the surface 640 of the front housing section when attached thereto. More particularly, the shoulder 635 of parasitic radiator 608 is affixed to the inside surface 640 between two rows of apertures 660, through which keys 109 (FIG. 1) of keypad 106 project. The shoulder of parasitic radiator 608 is narrow such that it fits snugly between the rows of apertures without extending into these apertures to avoid interference with the operation of keys 109. Elbow 637 is attached to surface 640 such that it curves from the front wall 642 to the side wall 643. Arm 634 is attached to wall 643 using an adhesive such that it extends along this side wall. Most preferably wall 643 is flat such that the arm 634 extends in a single plane. Arm 536 and elbow 538 are similarly connected to side wall 144. In this manner, the thin flexible strip is attached to the inside of the front housing section with the shoulder 635 of the parasitic radiator 608 positioned at a predetermined location.

The positioning of the flap antenna 407 on flap 403 is such that cross members 428, 430 are at predetermined locations. The predetermined locations of the cross members 428, 430 are such that these cross members are positioned over the surface of front wall 642 which is between the two rows of apertures 660 and to which the shoulder 535 of the parasitic radiator is connected when the flap 403 is closed. Thus, when the flap is closed, the cross members 428, 430 and the shoulder 535 are aligned and positioned proximate one another, as represented by the arrow in FIG. 1. The cross members 428, 430 and the shoulder 535 are spaced by the thickness of the front housing section of the flap 103 and the front housing section of the body 101. Additionally, the shoulder 535 of the parasitic radiator is inductively coupled to the cross members 428, 430, which are the high current portion of the flap antenna. Because shoulder 535 is coupled to cross members 430 and 428 when the flap is closed, the arms 534 and 536 form a second dipole antenna which is parasitically coupled to dipole antenna 407. This coupling is an inductive coupling.

In operation, when the flap is open, flap antenna 107 is positioned away from the parasitic radiator 108 and body 101 such that the antenna has high performance characteristics without interference from the user, circuitry in the body housing 101, or the body housing 101. When the flap is closed, as illustrated in FIG. 2, the flap antenna is moved to a position proximate the body and the circuitry in housing 101. This causes decrease in the performance of antenna 107. However, the cross members 428, 430 of antenna 407 are positioned proximate to shoulder 535 such that the two antennas are parasitically coupled to parasitic radiator 148. The antenna system performance characteristics are thus determined by both the parasitic radiator 108 and the flap antenna 107 while the flap is closed. This coupling of the flap antenna and the parasitic radiator significantly improves the characteristics of the antenna system when the flap is closed, such that there is no significant degradation of the antenna performance caused by collapsing the radio telephone for storage. Consequently, the flap antenna does not impair the radio telephone's ability to receive an incoming call alerting signal.

According to an alternate embodiment of the parasitic radiator 708, the elbow 737 and elbow 738 joining arms 734 and arms 736 to base 735, respectively, are ninety degree corners having curved outer edges. The sum of length F of arm 734, length G of base 735, and length H of arm 736 is approximately one half the wavelength of the transceiver operating frequency. The embodiment of FIG. 5 is preferred because the tips 555, 556 of arms 534, 536 are further from shoulder 535 than the tips 755, 756 of the arms 734, 736, if the total length of the antenna are the same (i.e., if both antenna embodiments are quarter wavelength antennas).

Another alternate embodiment of the parasitic radiator 808 is illustrated in FIG. 8. Parasitic radiator 808 includes notches 858 in arms 834 and 836. Elbows 837 and 838 join arms 836 and to shoulder 835. The notches 858 in the arms are provided for positioning the arms around outwardly extending protrusions (not shown) of front housing section 605. This is particularly desirable if the inside surface of the front housing section has a large number of protrusions. It is desirable that the arms 834, 836 extend in a single plane for optimum antenna performance. This is particularly important since positioning of the parasitic radiator 508 adjacent the circuitry inside housing 101 will detrimentally affect performance of the antenna system. However, a disadvantage of the embodiment of FIG. 8 is the distance from tips 855, 856 to shoulder 835 is further shortened by the addition of the notches.

Accordingly it can be seen that an improved antenna system is disclosed for a communication device having movable body sections. The antenna system provides high performance characteristics when the antenna is opened and when the device is collapsed for ease of storage.

I claim:

1. A multi-position antenna system for a device including a housing having a first housing portion and a second housing portion which are movingly interconnected such that they move relative to one another between a collapsed position and an extended position, and a transceiver positioned in the housing to transmit or receive signals via the antenna system, the antenna system comprising:

a first antenna supported in the first housing portion, the first antenna including a feed line and coupled to the transceiver in the collapsed position, the first antenna tuned to signals communicated via the transceiver; and a parasitic radiator supported in the second housing portion, the parasitic radiator tuned for a wavelength of signals communicated via the transceiver and not directly coupled to the transceiver, wherein the parasitic radiator is coupled to the first antenna when the housing is in the collapsed position and the parasitic radiator is not coupled to the first antenna when the housing is in the extended position, whereby the parasitic radiator is coupled to the transceiver in the housing through the first antenna when the housing is in the collapsed position.

2. The multi-position antenna apparatus as defined in claim 1 wherein the device includes a hinge assembly pivotably interconnecting the first and second housing portions and the first antenna is coupled to the transceiver through the hinge assembly.

3. The multi-position antenna apparatus as defined in claim 1, wherein the first antenna includes two conductors which are positioned on the first housing portion.

4. The multi-position antenna apparatus as defined in claim 1 wherein the first antenna is a half wavelength antenna.

5. The multi-position antenna apparatus as defined in claim 4, wherein the parasitic radiator is of a half wavelength.

6. The multi-position antenna apparatus as defined in claim 1, wherein the first antenna is a dipole antenna.

7. The antenna system as defined in claim 1, wherein the first antenna is connected to the transceiver in the extended and collapsed positions.

8. A multi-position antenna system for a device including a housing having a first housing portion and a second housing portion which are movingly interconnected such that they move relative to one another between a collapsed position and an extended position, and communication circuitry positioned in one of the first and second housing portions to transmit or receive signals via the antenna system, the antenna system comprising:

a first antenna supported in the second housing portion, the first antenna coupled to the communication circuitry in the extended position and in the collapsed position, wherein the first antenna includes two conductors, and each of the two conductors is mounted on the second housing portion and including a cross member connecting a middle finger segment to an outer finger; and a parasitic radiator supported in the first housing portion such that the parasitic radiator is coupled to the first antenna when the housing is in the collapsed position and the parasitic radiator is not coupled to the first antenna when the housing is in the extended position.

9. The multi-position antenna apparatus as defined in claim 8, wherein the parasitic radiator is generally U shaped, including two arms projecting from a shoulder.

10. The multi-position antenna apparatus as defined in claim 9, wherein the cross member and the shoulder are positioned proximate one another when the first and second housing portions are in the collapsed position whereby the first antenna and the parasitic radiator are coupled.

11. A radio telephone, comprising:

a housing having a first housing portion and a second housing portion which are interconnected such that the they move relative to one another between a first position for receiving a call and a second position for originating and conducting a call;

transceiver circuitry positioned in the first housing portion and coupled to a microphone and a speaker, the transceiver circuitry to transmit and receive signals;

a first antenna supported in the second housing portion, the first antenna coupled to the transceiver circuitry, the first antenna tuned to the transceiver circuitry; and a parasitic radiator positioned in the first housing portion, the parasitic radiator tuned for the wavelength of signals communicated via the transceiver circuitry and the parasitic radiator not directly coupled to the feed line of the first antenna, wherein the parasitic radiator is proximate the first antenna when the housing is in the first position, whereby the parasitic radiator and the first antenna are coupled such that the parasitic radiator is coupled to the transceiver circuitry through the first antenna when the housing portions are in the first position to improve antenna performance when the housing is in the first position, and the parasitic radiator and the first antenna are spaced from one another such that the parasitic radiator is decoupled from the first antenna when the housing is in the second position.

12. The radio telephone as defined in claim 11 further including a hinge pivotably interconnecting the first and second housing portions.

13. The radio telephone as defined in claim 12, wherein the second housing portion includes a flap and the first housing portion includes a body.

14. The radio telephone as defined in claim 13, wherein the first antenna includes two conductors extending through the hinge for interconnecting the first antenna to the transceiver circuitry.

15. The radio telephone as defined in claim 11 wherein the first antenna is a half wavelength antenna.

16. The radio telephone as defined in claim 15, wherein the parasitic radiator is a half wavelength antenna.

17. The radio telephone as defined in claim 11, wherein the first antenna is a dipole antenna.

18. The radio telephone as defined in claim 17, wherein the parasitic radiator is a dipole antenna.

19. A radio telephone, comprising:

a housing having a first housing portion and a second housing portion which are interconnected such that the they move relative to one another between a first position for receiving a call and a second position for originating and conducting a call;

transceiver circuitry positioned in the first housing portion and coupled to a microphone and a speaker, the transceiver circuitry to transmit and receive signals;

a first antenna supported in the second housing portion, the first antenna coupled to the transceiver circuitry and including two conductors and a first shoulder; and a parasitic radiator positioned in the first housing portion such that the parasitic radiator is proximate the first antenna when the housing is in the first position, whereby the parasitic radiator and the first antenna are coupled to improve antenna performance when the housing is in the first position, and the parasitic radiator and the first antenna spaced form one another when the housing is in the second position, wherein the two conductors are mounted on the second housing portion in a generally E shaped configuration, having cross members connecting middle finger segments to outer fingers.

20. The radio telephone as defined in claim 19, wherein the parasitic radiator is generally U shaped, including two arms projecting from a second shoulder.

21. The radio telephone as defined in claim 20, wherein the first and second shoulders are positioned proximate one another when the first and second housing portions are in the first position such that the antenna and parasitic radiator are parasitcally coupled.

22. A method of providing a high performance multi-position antenna for a radio telephone transceiver, comprising the steps of:

providing first and second housing portions which are movingly interconnected to move between a collapsed position for storage and an extended position for use;

mounting an antenna on a first housing portion of the radio telephone transceiver such that the position of the antenna relative to the second housing portion is changed by moving the first housing portion, the first antenna coupled to the transceiver circuitry in the extended position and the collapsed position, and the first antenna tuned to the transceiver circuitry;

mounting a parasitic radiator on the second housing portion, the parasitic radiator tuned for the operating frequency of signals communicated via the transceiver, wherein the first antenna and the parasitic radiator are coupled when the first and second housing portions are collapsed and the first antenna and the parasitic radiator are not coupled when the first and second housing portions are in the extended position, whereby the parasitic radiator is coupled to the transceiver via the first antenna in the collapsed position.

* * * * *